Dec. 11, 1928.
O. A. JOHNSON
SCALE INDICATOR
Filed March 24, 1928
1,694,658
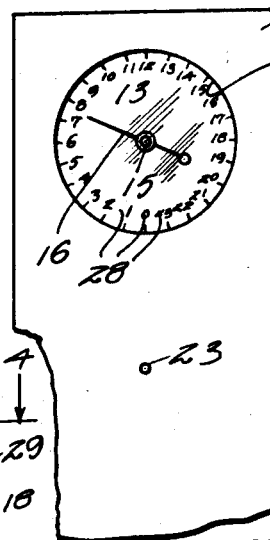
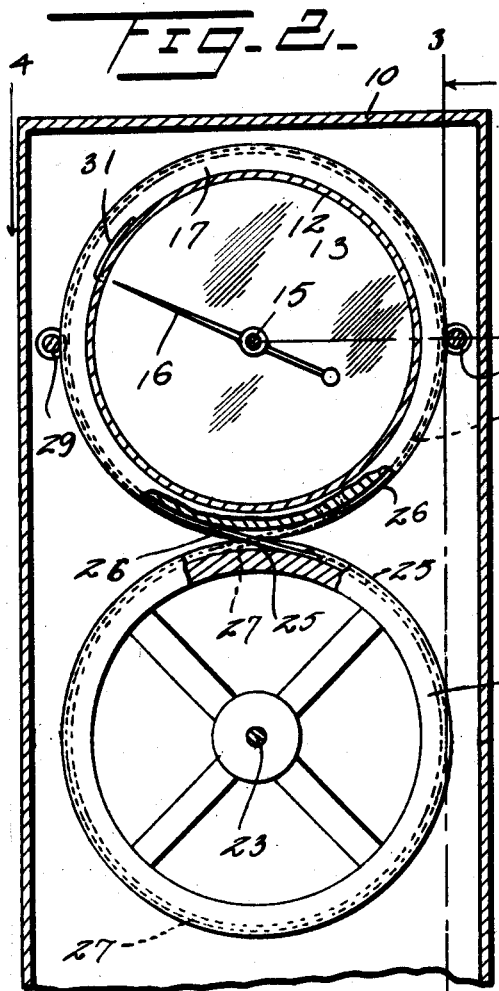
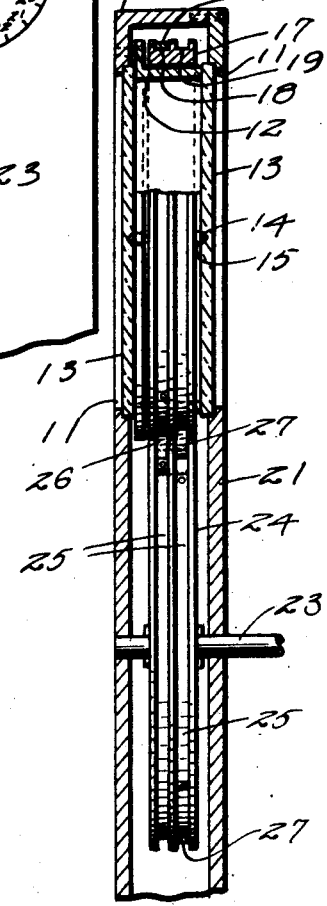
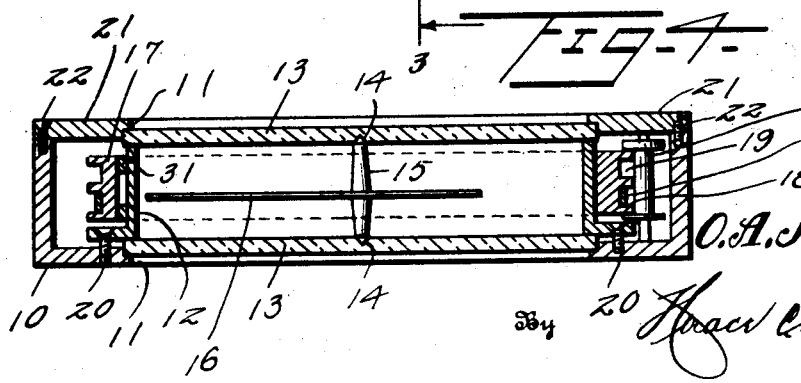
Inventor
O. A. Johnson
By*Horace A. Chandler*
Attorney Patented Dec. 11, 1928.

1,694,658

UNITED STATES PATENT OFFICE.

OLAF A. JOHNSON, OF MINNEAPOLIS, MINNESOTA.

SCALE INDICATOR.

Application filed March 24, 1928. Serial No. 264,483.

This invention relates to new and useful improvements in indicating devices, and particularly to indicating devices for use in connection with weighing scales, and like machines.

One object of the invention is to provide an indicator, driven from the mechanism of the scales, and wherein the said connections are completely obscured from the view of the customer, as well as the salesman.

Another object is to provide a novel and simple construction wherein the indicating hand is moved around the dial by means of a permanent magnet, which obviates the usual links, levers, and gears.

Other objects and advantages will be apparent from the following description when taken in connection with the accompanying drawing.

In the drawing:

Figure 1 is a front elevation of an indicating device made in accordance with the present invention.

Figure 2 is a similar view, but with the front wall of the casing removed.

Figure 3 is a vertical sectional view on the line 3—3 of Figure 2, showing the connections between the driving wheel and the hand operating ring.

Figure 4 is a horizontal sectional view on the line 4—4 of Figure 2.

Referring particularly to the accompanying drawing, there is shown a frame 10, which is hollow as shown, and has the opening 11 therethrough, said opening being of circular outline, and secured within said opening, and held in spaced parallel relation, by means of the flat ring 12, are the glass disks or panes 13. In the center of the inner face of each of said glass disks there is formed a small recess 14, in which is received an end of the shaft 15, on which is mounted the indicating hand 16. Disposed wthin the hollow frame, in surrounding relation to the ring 12, is a ring 17, said ring having the peripheral grooves 18 and 19 in its outer edge. The ring 12 is preferably in the form of an angle member with one of its wings secured to the frame 10, by means of the screws 20. The frame 10 is also provided with the removable ring 21, held thereon by the screws 22, which permits access to the interior of the frame for adjustments and repairs to the various parts of the device. Mounted on a shaft 23, below the ring 17, is a disk or wheel 24, the upper portion of the periphery of which contacts with the lower portion of the periphery of the ring 17. The shaft 23 is driven by the mechanism of the scales, not shown, in any suitable manner.

Secured to the upper portion of the periphery of the wheel 24, within one of the grooves 25, in the periphery thereof, is an end of a metal strip 26, said strip being passed around the ring 17, in the groove 18, toward the left, as viewed in Figure 1, the other end of said strip being secured to the ring, at a point adjacent that at which the first-named end is secured to the wheel. A second metal strip or band 27 has one end secured within the groove 19, in the periphery of the ring 17, adjacent the periphery of the wheel 24, and is passed around the wheel, within the other groove thereof, and has its other end secured to the wheel, at a point adjacent the first-named end. This strip or band 27, is, as will be seen in Figure 4, passed around the wheel 24, in the opposite direction to that in which the first strip or band is passed around the ring 17, whereby the ring will be driven in either direction, according to the direction of rotation of the wheel 24.

Formed on the face of one of the glass disks 13, in any suitable manner, and in a circular series, are numerals 28, seen in Figure 1, over which the indicating hand 16 is adapted to traverse. Grooved wheels 29 are mounted in the frame 10, for engagement with the ring 17, whereby to maintain the same in proper position with relation to the wheel 24. Secured in the inner face of the ring 17 is a permanent magnet 31, which attracts the indicating hand 16, to cause the same to traverse the dial, as the mechanism of the scales rotate the wheel 24. It will be understood that one of the strips or bands serves to rotate the ring 17 to cause the hand 16 to indicate the weight of the article placed on the scales, while the other strip or band serves to restore the indicator to normal position.

The indicator, as viewed from the customer's side of the counter, presents a clear transparent glass through which the customer may see the salesman, while the salesman may readily see the customer. The indicating hand 16 is clearly visible, but none of the mechanism connected with the scales, or such parts as serve to produce the rotation of the ring 17, can be seen. The customer simply sees the hand rotate, without seeing anything which causes such rotation.

While I have shown and described the indicator as especially adapted for use in connection with weighing scales, it will be understood that such indicator may be used in connection with any machine or device where such an indicator is adapted.

What is claimed is:

1. An indicating device for a weighing scale comprising a casing, a wheel in the casing having means for operative connection with a scale mechanism, a ring supported on the upper portion of the wheel, driving connections between the wheel and ring, transparent plates secured in opposite sides of the casing and having a series of graduations thereon, an indicating hand between the plates and having its shaft journaled in said plates, a second ring within the first ring and supporting the latter, and guiding means in the casing engaged with the periphery of the first ring.

2. A scale indicator comprising a casing having a sight opening through the upper portions of its front and rear walls, transparent plates secured within said openings and having central recesses in their inner faces, the said plates having circular series of graduations, an indicating hand between the plates and having a shaft the ends of which are supported in said recesses, a stationary ring within the casing in surrounding relation to the sight openings, a second ring rotatable on the first ring and having peripheral grooves, a peripherally grooved wheel arranged below the second ring and supporting the same thereon, reversely wound flexible bands connected with the second ring and wheel and playing in the grooves thereof, and a magnet on the second ring for moving the indicating hand as said ring is driven by the said wheel.

In testimony whereof, I affix my signature.

OLAF A. JOHNSON.